(12) United States Patent
Cunha et al.

(10) Patent No.: US 6,955,522 B2
(45) Date of Patent: Oct. 18, 2005

(54) METHOD AND APPARATUS FOR COOLING AN AIRFOIL

(75) Inventors: Frank J. Cunha, Avon, CT (US); Michael A. Palumbo, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 195 days.

(21) Appl. No.: 10/408,518

(22) Filed: Apr. 7, 2003

(65) Prior Publication Data

US 2004/0197191 A1 Oct. 7, 2004

(51) Int. Cl.$^7$ ................................................ F01D 5/18
(52) U.S. Cl. ..................................... 415/115; 416/97 R
(58) Field of Search ............................. 415/115, 116; 416/97 R, 97 A, 96 R, 90 R (56) References Cited

U.S. PATENT DOCUMENTS

| | | | |
|---|---|---|---|
| 5,779,437 A | * | 7/1998 | Abdel-Messeh et al. .... 415/115 |
| 6,050,777 A | | 4/2000 | Tabbita et al. ............ 416/97 R |
| 6,210,112 B1 | | 4/2001 | Tabbita et al. ............ 416/97 R |
| 6,247,896 B1 | | 6/2001 | Auxier et al. ............. 416/97 R |
| 6,280,140 B1 | | 8/2001 | Soechting et al. ........ 416/97 R |
| 6,402,470 B1 | | 6/2002 | Kvasnak et al. .......... 416/97 R |
| 6,514,042 B2 | | 2/2003 | Kvasnak et al. .......... 416/97 R |

* cited by examiner

Primary Examiner—F. Daniel Lopez
Assistant Examiner—Dwayne White
(74) Attorney, Agent, or Firm—Linda A.P. Cunha (57) ABSTRACT

An improved cooling design and method for cooling airfoils within a gas turbine engine is provided which includes a plenum longitudinally located within the leading edge of the airfoils. Within the plenum are positioned a plurality of turbulence promoters to provide enhance heat transfer within the leading edge. Also, the cooling design includes a plurality of inlets to receive cooling air from an internal cavity of the airfoil as well as a plurality of outlets located within a trench on the exterior surface of the leading edge through which the cooling air exits to film cool leading edge.

32 Claims, 4 Drawing Sheets

METHOD AND APPARATUS FOR COOLING AN AIRFOIL

The government may have rights in this invention, pursuant to Contract Number F33615-02-C-2202, awarded by the United States Air Force, Wright Patterson Air Force Base.

BACKGROUND OF THE INVENTION

This invention relates generally to gas turbine engines, and, more specifically, to turbine airfoil cooling.

Efficiency is a primary concern in the design of any gas turbine engine. Historically, one of the principle techniques for increasing efficiency has been to increase the gas path temperatures within the engine. Using internally cooled components made from high temperature capacity alloys has accommodated the increased temperatures. Turbine stator vanes and blades, for example, are typically cooled using compressor air. Cooling is typically extracted from the compressor at a temperature lower and pressure higher than the core gas passing through the turbine section. The cooler compressor air provides the medium for heat transfer and the difference in pressure provides the energy required to pass the cooling air through the stator or rotor stage. It will be understood that compressor bleed air for such cooling will be unavailable to support combustion in the combustor. A significant percentage of the work imparted to the air bled from the compressor, however, is lost during the cooling process. The lost work does not add to the thrust of the engine and negatively effects the overall efficiency of the engine. A person of skill in the art will recognize therefore, that there is a tension between the efficiency gained from higher core gas path temperatures and the concomitant need to cool turbine components and the efficiency lost from bleeding air to perform that cooling. There is, accordingly, great value in maximizing the cooling efficiency of whatever cooling air is used.

Thus, to minimize any sacrifice in engine performance due to the unavailability of cooling airflow to support combustion, any scheme for cooling blades and vanes must optimize the utilization of compressor bleed cooling air. Airfoil cooling is accomplished by external film cooling, internal air impingement and forced convection, either separately or a combination of all cooling methods.

In forced convection cooling, compressor bleed air flows through the internal cavities of the blades and vanes, continuously removing heat therefrom. Typically, compressor bleed air enters internal cavities of the blades and vanes through one or more inlets which discharges into the internal cavities.

Film cooling has been shown to be very effective but requires a great deal of fluid flow to be bled off the compressor for cooling. Further, film cooling is actively controlled in a complex and expensive manner. Also, the fabrication and machining of an airfoil with film cooling holes not only adds a degree of complexity but is also costly. It will also be appreciated that once the cooling air exits the internal cavity of the airfoil and mixes with the hot combustion gases, a severe performance penalty is incurred due to the mixing process and the different temperature levels of the mixing flows.

In many cases, it is desirable to establish a film of cooling air along the surface of the stator or rotor airfoil by bleeding cooling air out of cooling holes. The term "bleeding" reflects the small difference in pressure motivating the cooling air out of the internal cavity of the airfoil. The film of cooling air traveling along the surface of the airfoil directs the flow of high thermal energy hot gas away from the airfoil, increases the uniformity of the cooling, and thermally insulates the airfoil from the passing hot gas stream flow. A person of skill in the art will recognize, however, that film cooling is difficult to establish and maintain in the turbulent environment of a gas turbine.

A known method of establishing film cooling involves positioning cooling holes in or adjacent the leading edge of an airfoil in a "showerhead" arrangement. The showerhead typically includes a row of cooling holes on either side of the leading edge. The cooling holes are angled aft and are often diffused to facilitate film formation. In some cases, the showerhead includes a row of holes positioned directly on the leading edge. U.S. Pat. No. 5,374,162 discloses an example of such an arrangement.

One problem associated with using holes to create a cooling air film is the film's sensitivity to pressure difference across the holes. Too great a pressure difference across a cooling hole will cause the air to jet out into the passing core gas rather than aid in film formation. Too small a pressure difference will result in negligible cooling air flow through the hole, or worse, an in-flow of hot core gas. Both cases adversely affect film cooling effectiveness. Another problem associated with using holes to establish film cooling is that cooling air is dispensed from discrete points along the span of the airfoil, rather than uniformly and along a continuous line. The gaps between cooling holes, and areas immediately downstream of those gaps, are exposed to less cooling air than are the holes and the spaces immediately downstream of the holes, and are therefore more susceptible to thermal distress. Yet another problem associated with using holes to establish film cooling is the stress concentrations that accompany each hole. Stress concentrations develop when loads (typically resulting from dynamic forces or thermal expansion) are carried by narrow expanses of material extending between adjacent holes. Film cooling effectiveness generally increases when the cooling holes are closely packed and skewed aft at a shallow angle relative to the external surface of the airfoil. Skewed, closely packed apertures, however, are more prone to stress concentrations. Thus, film cooling requires a greater amount of cooling air with the possibility of inadequate cooling of the outer surfaces of the airfoil.

Some prior art configurations have cooling holes disposed in the leading edge aligned with an average stagnation line, that extend perpendicular to the external surface of the airfoil. High temperature core gas (which include air and combustion products) encountering the leading edge of an airfoil will diverge around the suction and pressure side portions of the airfoil, with some of the gas impinging on the leading edge. The point along the airfoil where the velocity of the core gas flow decelerates to zero (i.e., the impingement point) is referred to as the stagnation point. There is a stagnation point at every spanwise position along the leading edge, and collectively those points are referred to as the stagnation line. Air impinging on or adjacent the leading edge is subsequently diverted around either side of the airfoil. In actual practice, rotor speeds and core gas velocities vary depending upon engine operating conditions as a function of time and position along the leading edge. Such a cooling hole arrangements can experience an asymmetrical cooling air distribution. For example, an actual stagnation line shift to one side of a row of cooling holes can urge exiting cooling air to one side of the row, consequently leaving the opposite side starved of cooling air. The fact that the stagnation line can and does shift during airfoil operation illustrates that locating holes on the average stagnation line will not remedy all cooling air distribution problems. Cooling holes extending perpendicular to the external surface and skewed spanwise do not resolve the potential for asymmetrical cooling air distribution.

Also, some prior an configurations employ a trench at the leading edge with cooling holes exiting into a trench. The cooling holes are discrete cooling points with uncooled areas inbetween. The cooling holes must fill the trench such that the cooling air can dwell within the trench and bled out of the trench. Key to use of the trench requires that the trench be filled with cooling air. However, the addition of too many cooling holes requires a significant amount of cooling air from the compressor that can negatively impact turbine efficiency. Also, too many cooling holes located at the leading edge of the airfoil can create undesirable thermally induced stresses in the metal between the holes. Further, if the trench is not adequately filled then there is a risk of uncooled areas between the holes. Finally, the prior art configurations rely on film cooling to cool the leading edge and aft of the leading edge thus requiring a significant amount of cooling air to ensure adequate film coverage.

Turbine engine blade designers and engineers are constantly striving to develop more efficient ways of cooling airfoils and prolong turbine blade life and reduce engine operating cost. Cooling air used to accomplish this is expensive in terms of overall fuel consumption. Thus, more effective and efficient use of available cooling air in carrying out cooling of turbine airfoil and, in particular, a leading edge of an airfoil is desirable, not only to prolong turbine airfoil life, but also to improve the efficiency of the engine as well, thereby lowering engine operating cost. Consequently, there is a continuing need for airfoil cooling designs that will make more effective and efficient use of available cooling air.

Thus, what is needed to extend the durability of a turbine airfoils is an improved cooling design suitable for use at a leading edge of an airfoil that provides reliable, complete and uniform film cooling while optimizing the cooling air necessary and reducing the stress associated with the spacing between the cooling apertures. Further, what is needed is a leading edge cooling configuration that employs film cooling, impingement cooling and convective cooling and that can be manufactured with the casting process.

SUMMARY OF THE INVENTION

The above discussed and other drawbacks and deficiencies are overcome or alleviated by the present invention.

The present invention provides an airfoil cooling system that employs a new and effective approach to convectively cool a leading edge of an airfoil in combination with film cooling. In particular, this combination provides an advantage over the prior art leading edge cooling schemes in that, to achieve the same metal temperature at the leading edge, less cool compressor air is required. Less compressor air flow results in the additional advantage of providing an increase in turbine efficiency without adversely affecting airfoil durability.

The airfoil of the present invention includes an internal cavity into which cooling flow is flowable from an end of the airfoil, and an external wall which includes suction and pressure sidewalls joined together at leading and trailing edges and extending from a first end at a platform to a second end. Cooling air from the internal cavity enters a first plenum through a plurality of inlets, impinges onto a plurality of discrete bow-tie shaped pedestals and is directed into a plurality of exit slots that direct the cooling air exiting onto the suction sidewall to film cool the airfoil. Similarly, cooling air from the internal cavity enters a second plenum through a plurality of inlets, impinges onto a plurality of discrete pedestals and is directed into a plurality of exit slots that direct the cooling air over onto the suction sidewall to film cool the airfoil.

As described above, the present invention can be implemented and utilized in connection with many alternative airfoil (blade and vane) configurations. The combination of effective convective cooling and effective thermal insulation on the leading edge due to film cooling provides a cooler leading edge design, as compared to conventional and current designs. Thus, the present invention provides a film of cooling air having increased uniformity and durability downstream of the leading edge on both sides of the airfoil. Another advantage of the present invention is that stress is minimized along the leading edge and areas immediately downstream of the leading edge. Further, the design of the present invention permits the spacing of the exit slots to be spaced so as to uniformly spread the cooling air in a blanket for improved film coverage while providing turbulence inside for increased heat pick-up and improved cooling effectiveness. Thus, advantageously, an airfoil leading edge employing the beneficial cooling design of the present invention will not only have a longer service life and durability but also improve overall turbine efficiency.

The present invention also contemplates a method for cooling a leading edge of a turbine blade suitable for use in gas turbine, comprising the steps of fabricating a microcircuit within the leading edge and providing cooling air flow from a cooling fluid source to flow into a plurality of inlets of the microcircuit.

These and other objects, features and advantages of the present invention will become apparent in light of the detailed description of the best mode embodiment thereof, as illustrated in the accompanying drawings.

BRIEF DESCRIPTION OF THE DRAWINGS

The present invention will now be described, by way of example, with reference to the accompanying drawings in which.

DETAILED DESCRIPTION OF THE INVENTION

Figure 1:
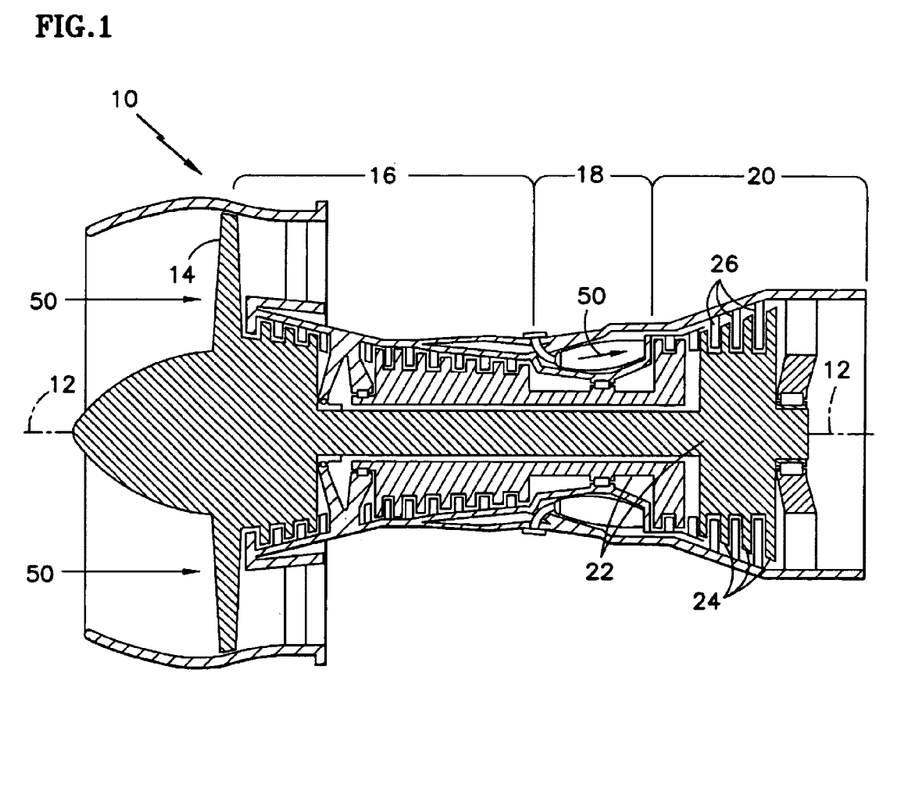
FIG. 1 is a cross-sectional view of a gas turbine engine of the type employing the turbine airfoils of the present invention.

A gas turbine engine 10, such as a gas turbine used for power generation or propulsion, circumferentially disposed about an engine centerline, or axial centerline axis 12 is shown. The engine 10 includes a fan 14, a compressor 16, a combustion section 18 and a turbine 20. As is well known in the art, air compressed in the compressor 16 is mixed with fuel which is burned in the combustion section 18 and expanded in turbine 20. The air compressed in the compressor 16 and the fuel mixture expanded in the turbine 20 can both be referred to as a hot gas stream flow (hot combustion gases, gas flow stream) 50. The turbine 20 includes rotors 22 which, in response to the expansion, rotate driving the compressor 16 and fan 14. The turbine 20 comprises alternating rows of rotary airfoils or blades 24 and vanes 26. The use of the system of FIG. 1 is for illustrative purposes only and is not a limitation of the instant invention which may be employed on gas turbines used for electrical power generation and aircraft.

Figures 2, 3:
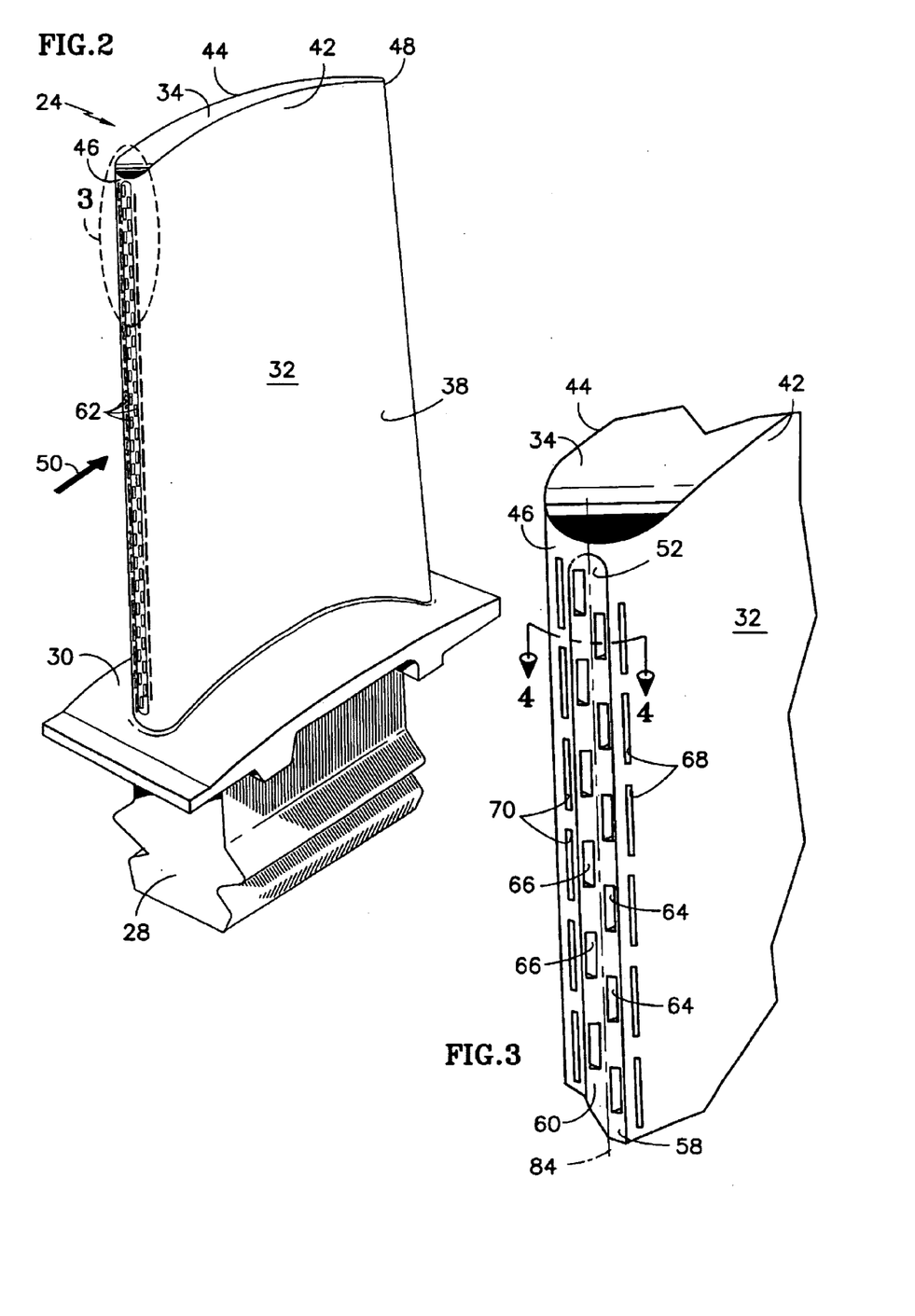
FIG. 2 is a perspective view of an airfoil incorporating the cooling scheme of the present invention along the leading edge.
FIG. 3 is a partial view of FIG. 2 illustrating cooling air flow across the leading edge of the airfoil of FIG. 2.

Referring now to FIGS. 2 and 3, the present invention will now be described. FIG. 2 is a perspective view of the blade 24 of the present invention. FIG. 3 is a partial view of the blade of FIG. 2. The blade 24 includes a root portion 28, a platform 30, an airfoil 32, and a tip 34. The blade 24 also includes a generally concave, first or pressure sidewall 42 spaced laterally or circumferentially in most part from a convex, second or suction sidewall 44. The respective sidewalls 42, 44 are joined together at axially opposite leading and trailing edges 46, 48, respectively, and extend longitudinally or radially from the root portion 28 where the airfoil 32 meets the platform 30 to the tip 34 that encloses the airfoil 32. Thus, the airfoil 32 has an external wall 38 which includes the suction sidewall 44 and pressure sidewall 42. The respective sidewalls 42, 44 extend chordwise between the leading and trailing edges 46, 48, respectively, and spanwise between the platform 30 and the tip 34. The hot combustion gases 50 (FIG. 1) flow across the exterior wall 38 of the airfoil 32.

Figure 4:
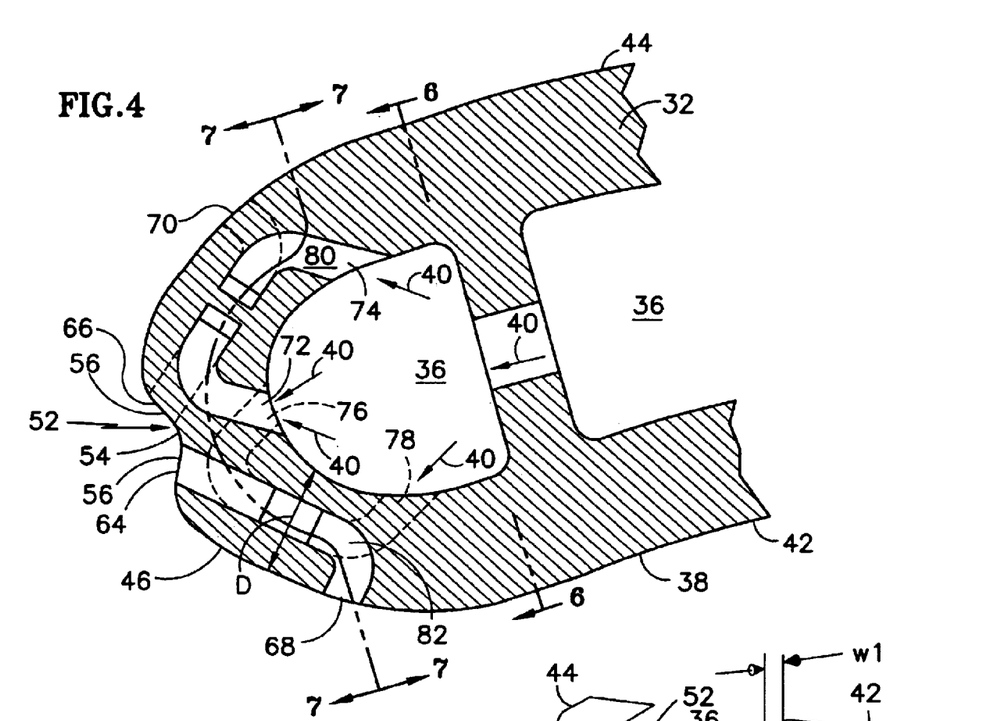
FIG. 4 is a partial section view of the airfoil of FIG. 2 taken along 4-4 of FIG. 3, having an internal cavity, feed inlets and exit slots.

Referring now to FIG. 4, a partial sectional view of the airfoil of FIG. 2 taken along 4-4 of FIG. 3 is shown. The airfoil 32 includes one or more internal cooling cavities 36 surrounded by the external wall, 38. The internal cooling cavities 36 may be of any conventional form, multi-pass serpentine channels (cooling circuit), with cooling air 40 typically being a portion of the air bled from the compressor 16 (FIG. 1) of the engine, as described hereinabove.

Referring now to FIGS. 3 and 4, the airfoil 32 includes a trench 52 disposed in the external wall 38, along the leading edge 46. The trench 52, which includes a base 54 and a pair of opposing sidewalls 56, is preferably centered on a line 84 (FIG. 3) representative of the stagnation lines of the highest heat load operating conditions for a given application (hereinafter that line will be referred to as the "Stagnation Line"). Thus, the trench 52 is partitioned into a first portion 58 located proximate to the pressure sidewall 42 and a second portion 60 located proximate to the suction sidewall 44. The first and second portions 58, 60 longitudinally extend along the leading edge 46. The width of the trench 52 is preferably large enough such that all stagnation lines will fall between the sidewalls 56 of the trench 52 under all operating conditions. If it is not possible to provide a trench 52 wide enough to accommodate all possible stagnation line positions, then the width and the position of the trench 52 are chosen to accommodate the greatest number of stagnation lines that coincide with the highest heat load operating conditions.

The airfoil 32 further includes a plurality of film cooling apertures 62 (FIG. 2) disposed along the leading edge 46 and preferably located within the trench 52 to provide a passage through the external wall 38 for the cooling air 40. More specifically, the cooling apertures 62 (FIG. 2) include a first aperture 64 disposed within the first portion 58 of the trench 52 and a second aperture 66 disposed within the second portion 60 of the trench 52. Most preferably, there is a longitudinally extending row of first apertures 64 and a longitudinally extending row of second apertures 64 such that the row of second apertures 64 is staggered or offset in relation to the first row of apertures 66. The airfoil 32 further includes a third aperture 68, preferably a row of third apertures, disposed on the pressure sidewall 42 of the airfoil 32 adjacent to the leading edge 46 and a fourth aperture 70, preferably a row of fourth apertures, disposed on the suction sidewall 44 of the airfoil 32 adjacent to the leading edge 46. In the exemplary embodiment, the first, second, third and fourth apertures 64, 66, 68, 70 are shaped as slots that extend lengthwise in the longitudinal direction.

Figure 5:
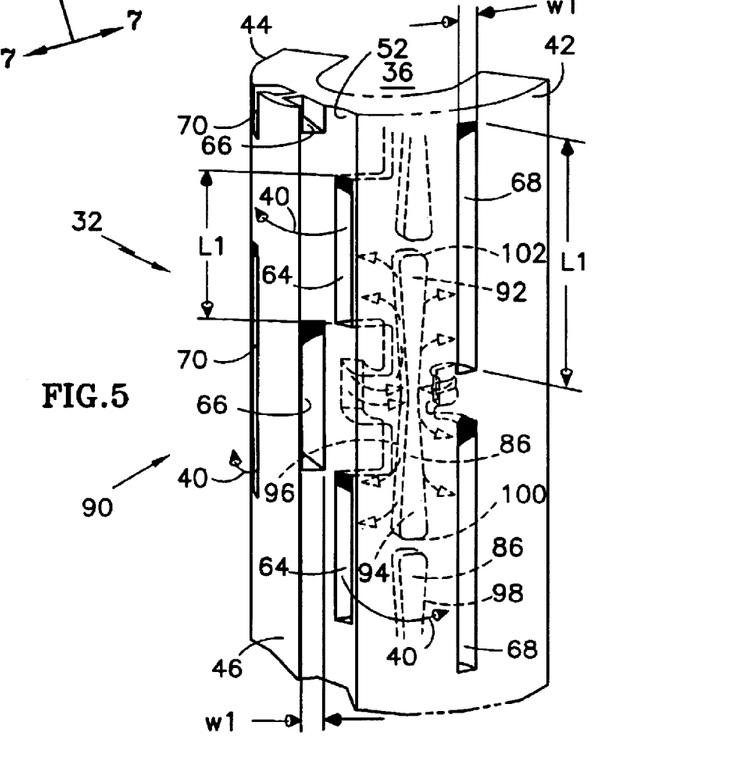
FIG. 5 is a partial perspective view of the leading edge of the airfoil of FIG. 2 illustrating an internal view of the cooling design within the leading edge.
Figures 6, 7:
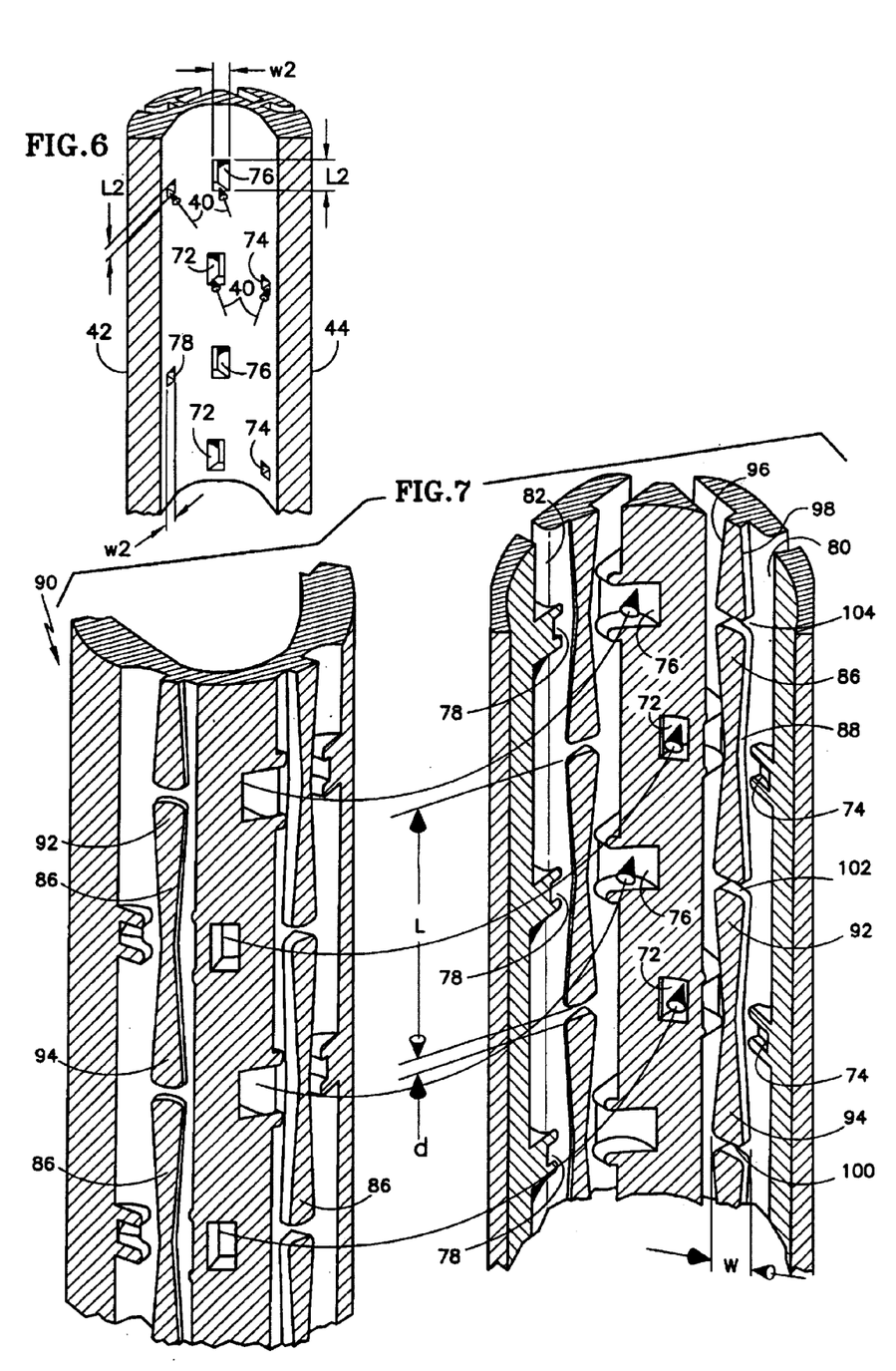
FIG. 6 is a partial perspective view taken along 6-6 of FIG. 4 that illustrates the feed inlets.
FIG. 7 is a partial perspective cut-away view showing the cooling design of the present invention in the leading edge of the airfoil of FIG. 2 and illustrating how cooling air is fed from the internal cavity into the leading edge.

Referring now to FIG. 5, a partial perspective view of the leading edge of the airfoil of FIG. 2 is shown. FIG. 5 illustrates the manner in which the first, second, third and fourth apertures 64, 66, 68, 70, respectively, are fed the cooling air 40 from the internal cooling cavities 36. Referring also to FIG. 6, a partial perspective view of the airfoil 32 taken along 66 of FIG. 4 is shown. FIG. 6 illustrates a first, second, third and fourth feed inlets 72, 74, 76, 78 through which the cooling air 40 is metered from the internal cavity 36 for distribution within the leading edge 46.

In the exemplary embodiment of the present invention, the leading edge 46 of the airfoil 32 includes the use of a microcircuit 90 longitudinally disposed within the leading edge 46 of the blade 24 as shown in FIGS. 5 and 6. Microcircuits offer tailorable, high convective efficiency cooling. Along with high convective efficiency, high film effectiveness is required for an advanced cooling configuration.

Microcircuits may be machined or otherwise molded within a part. In an exemplary embodiment, the microcircuits are formed of refractory metals forms and encapsulated in the part mold prior to casting. Several refractory metals including molybdenum (Mo) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Specifically, such microcircuits may be fabricated into parts including, but not limited to, combustor liners, turbine vanes, turbine blades, turbine shrouds, vane endwalls, and airfoil edges. Preferably, such parts are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle. After casting, the refractory metal can be removed, such as through chemical removal, thermal leeching, or oxidation methods, leaving behind a cavity forming the microcircuit 90 as shown in FIG. 5. It is noted that the cooling design of the present invention may also be manufactured using investment casting techniques with ceramic cores.

The cooling air 40 is fed from the internal cavity 36 through the feed inlets 72, 74, into a first longitudinally extending microcircuit plenum 80 for passage and redirection therein and discharges outside the airfoil 32 through the apertures 66, 70 (FIG. 5). Similarly, the cooling air 40 is fed from the internal cavity 36 through the feed inlets 76, 78 into a second longitudinally extending microcircuit plenum 82 for passage and redirection therein and, finally is discharged outside the airfoil 32 through the apertures 64, 68.

Referring now also to FIG. 7, the plenums 80, 82 and the features to the present invention are shown in further detail. FIG. 7 is a partial cut-away view showing the cooling design of the airfoil 32 taken along 7-7 of FIG. 4. Thus, it is seen that the plenums 80, 82 are micropassages or passages within the leading edge 46. It is understood that the pattern of feed inlets 72, 74, 76, 78 and the respective apertures (exit slots) 64, 66, 68, 70 described above is repeated along the leading edge of the airfoil, as shown in FIGS. 3 and 7.

Referring back to FIGS. 5 and 7, it is noted that within each of the plenums 80, 82 are longitudinally extending pedestals 86. In the exemplary embodiment, the pedestals 86 are propeller or bow-tied shaped such that the pedestals 86 have a center 88, (FIG. 7), and a first portion 92 (FIG. 7) and a second portion 94 (FIG. 7). The first and second portions 92, 94 are tapered outward from and integral with the center 88 where the first portion 92 is longitudinally closer to the tip 34 (FIG. 3) than the second portion 94. The pedestals 86 also have a first side 96, an opposing second side 98 and opposing ends 100, 102. The first side 96 generally faces the leading edge 46 while the second side 98 generally faces the respective sidewalls 42, 44 as shown in FIG. 7. The pedestals 86 are located within each of the plenums 80, 82 and are longitudinally or radially aligned within the leading edge and end 100 to end 102 with a gap 104 therebetween. Preferably, each of the centers 88 are positioned so as to be aligned with the cooling air 40 that enters the plenums 80, 82 from the respective feed inlets 72, 74, 76, 78. The gap, d, between the pedestals 86 has a radial length of no greater than about 0.020 inches. Also, the width, w, of the pedestals is no greater than about 0.060 inches and the radial length, L, of the pedestals is no greater than about 0.150 inches. It is also noted that the pedestals 86, in the exemplary embodiment, fully extend within each of the respective plenums 80, 82 such that the cooling air 40 is not permitted to flow over the first and second sides 96, 98.

With reference to FIGS. 5, 6 and 7, the benefits of the present invention illustrated and described herein are further understood with a discussion on how the invention operates to cool the airfoil.

The cooling air flow 40 relative to the first plenum 80 will be described. The cooling air 40 enters the first plenum 80 from the internal cavity 36 through the feed inlet 72. Upon entering the first plenum 80, the cooling air 40 impinges onto the center 88 of the pedestal 86 to which it is immediately aligned and is guided along the first side 96, and more specifically, the first and second portion 92, 94 of the pedestal 86 for redirection and discharge through exit slots 66. In this way, the first portion 92 guides the cooling air 40 to the exit slot 66 that is most immediate and proximate to the first portion 92 while the second portion 94 guides the cooling air 40 to the exit slot 66 that is most immediate and proximate to the second portion 94. Thus, in this way, and as shown in FIGS. 5 and 7, the cooling air 40 exits through adjacent exit slots 66.

Similarly, the next feed inlet 72 in the row of feed inlets 72 will also direct the cooling air 40 into the first plenum 80 where it will be directed against the center 88 of another pedestal 86. The cooling air 40 impinges onto the first and second portions 92, 94 of the pedestal 86 such that the first portion 92 guides the cooling air 40 to the exit slot 66 that is most immediate and proximate to the first portion 92 while the second portion 94 guides the cooling air 40 to the exit slot 66 that is most immediate and proximate to the second portion 94. In this way and as shown in FIGS. 5 and 7, it can be appreciated that each of the exit slots 66 are being directed cooling air from the first portion 92 of one pedestal 86 and the and a second portion 94 of the pedestal 86 that is immediately adjacent to it. Thus, it is appreciated that this dual feed of each of the exit slots 66 from adjacent feed inlets 72 ensures that there is an adequate and uniform cooling air exiting from each of the exit slots 66 to film cool the airfoil 32. As a consequence, this dual feed also ensures that the trench 52 is filled with the cooling air 40.

It will also be appreciated that in the exemplary embodiment, each of the feed inlets 72 feeds the cooling air into the plenum 80 for discharge through a row of exit slots 66. Thus, as described above, the cooling air 40 discharged through each exit slot 66 is being fed cooling air from the plenum 80 that is being directed into it from two adjacent feed inlets 72. In this way, this pattern of flow of the cooling air 40 is repealed along the leading edge 46 of the airfoil 32 with the row of feed inlets 72, row of exit slots 66 and row of pedestals 86.

Likewise, the cooling air 40 enters the first plenum 80 from the internal cavity 36 through the second feed inlet 74. Upon entering the first plenum 80, the cooling air 40 impinges onto the center 88 of the pedestal 86 to which it is aligned and is guided along the second side 98 of the pedestal 86 for redirection and discharge through exit slots 70. The cooling air 40 impinges onto the first and second portions 92, 94 of the pedestal 86 such that the first portion 92 guides the cooling air to the exit slot 70 that is most immediate and proximate to the first portion 92 while the second portion 94 guides the cooling air to the exit slot 70 that is most immediate and proximate to the second portion 94. In this way, and as shown in FIGS. 5 and 7, the cooling air 40 exits through adjacent exit slots 70. Similarly, the next feed inlet 74 in the row of feed inlets 74 will also direct cooling air into the first plenum 80 where it will then be directed against the center 88 of another pedestal 86. The cooling air 40 impinges onto the first and second portions 92, 94 of the pedestal 86 such that the cooling air 40 from the first portion 92 is directed to the exit slot 70 that is most proximate to the first portion 92 while the cooling air 40 from the second portion 94 is directed to the exit slot 70 that is most proximate to the second portion 94. In this way, it can be appreciated that each of the exit slots 70 are being directed cooling air from the first portion 92 of one pedestal 86 and the second portion 94 of the pedestal 86 that is immediately adjacent to it. Thus, this dual feed of each of the exit slots 70 from adjacent feed inlets 74 ensures that there is an adequate and uniform cooling air exiting from each of the exit slots 70 to film cool the airfoil 32.

It will be also appreciated that in the exemplary embodiment, each of the feed inlets 74 feed the cooling air 40 into the plenum 80 for discharge through a row of exit slots 70. Thus, as described above, the cooling air discharged through each exit slot 70 is being fed cooling air 40 from the plenum 80 that is being directed into it from two adjacent feed inlets 74. This pattern of flow of the cooling air 40 is repeated along the leading edge 46 of the airfoil 32 with the row of feed inlets 74, row of exit slots 70 and pedestals 86.

The description above described for the cooling air flow from the internal cavity 36 through the feed inlets 72, 74, into the first plenum 80, impinging onto the pedestals 86, and exiting through the exit slots 66, 70, respectively, is in like manner to that for the cooling flow 40 from the internal cavity 36 through the feed inlets 76, 78, into the second plenum 82, impinging onto the pedestals 86 within the second plenum 82 and discharging through the apertures 64, 68, respectively.

It is noted that once the cooling air 40 is discharged through exit slots 66, it is directed towards the pressure sidewall 42 as it does not have sufficient momentum flux to over power the momentum flux of the free gas stream onto the blade 24 (FIG. 2). Similarly, the cooling air 40 discharged through exit slots 64 is directed towards the suction sidewall 44. Thus, the entire length of the trailing edge 46 is enveloped in a blanket or cooling air. Attention is drawn to the fact that exit slots 64, 66 thus fill the trench 52 with cooling air to assist in providing a continuous film blanket that approximates one hundred percent film coverage to protect and cool the airfoil 32. To further enhance the film cooling of the airfoil 32 and, in particular, the leading edge 46, the cooling air 40 discharged through the exit slot 68 provides for film cooling of the pressure sidewall 42 while the cooling air 40 discharged through the exit slot 70 provides for film cooling of the suction sidewall 44.

In the exemplary embodiment and best seen in FIG. 4, the distance, D, of the microcircuit when it is embedded into the leading edge 46 is preferably approximately about 0.030 inches to approximately about 0.050 inches, and most preferably about 0.045 inches. Also in the exemplary embodiment, the length, L1, of each of the apertures 64, 66, 68, 70 is approximately about 0.100 inches to about 0.200 inches with a width, w1, of approximately about 0.012 inches to about 0.020 inches. Preferably, the length, L2, of each of the feed inlets 72, 74, 76, 78 is approximately about 0.015 inches to about 0.030 inches with a width, w2, of approximately about 0.012 inches to about 0.020 inches. It is further noted that the thickness of the microcircuit is most preferably 0.017 inches.

Further, the present invention also limits the amount of cooling air extracted from the internal cavities 36 of the blade 24 (FIG. 2) to achieve desirable and optimal leading edge cooling results. As mentioned hereinabove, the cooling air supply is obtained from the compressor 16 (FIG. 1) and is ultimately discharged into a region in the turbine 20 (FIG. 1). This is air that is taken away from the compressor 16 (FIG. 1) and from producing useful turbine work. The inlets 72, 74, 76, 78 of the present invention are therefore sized to be less than about approximately 1.0% of the free stream gas flow to reduce these parasitic loses.

The cooling effectiveness ratio is defined as the ratio of the temperature difference of the hot combustion gases 50 (FIG. 1) and the bulk metal temperature to the temperature difference between the hot combustion gases 50 (FIG. 1) and the coolant (cooling air). Preferably, turbine engineers and designers try to design for a cooling effectiveness ratio in excess of about approximately 70% because the cooler the metal temperature the better the overall durability of the blade 24 (FIG. 2). This is achieved in the present invention in two ways. First, film cooling is employed to reduce the temperature of the hot combustion gases 50 (FIG. 1) and insulate the airfoil 32 from the hot combustion gases 50 (FIG. 1). The temperature is reduced due to the mixing of the cooling air as it ejects from the exit slots 64, 66, 68, 70 into the hot combustion gas flow. But, it is not desirable to rely on this method completely since, as addressed hereinabove, the more cooling air taken away from the compressor 16 (FIG. 1), the less work the compressor 16 (FIG. 1) can produce. So, and as described above, the present invention employs a novel approach to internally convectively cool the leading edge 46 to achieve a desirable cooling efficiency. It is noted that traditional film cooling of the leading edge of airfoils does not employ this method to a high and reliable degree of efficiency The measure of convective cooling efficiency is a function of the heat pick up of the cooling air as it travels within the microcircuit 90, as follows:

$$\eta_c = [T_{coolant,out} - T_{coolant,in}]/[T_{metal} - T_{coolant,in}]$$

where:

$T_{coolant,out}$=temperature of the cooling air exiting the outlets $T_{coolant,in}$=temperature of the cooling air entering the inlets $T_{metal}$=bulk metal temperature of the airfoil.

In the equation above, turbine engineers and designers seek a design with a high heat pick up thus cooling the leading edge 46 of the airfoil 32 (FIG. 2). The present design achieves this increased heat pick up in a number of ways, as will now be detailed. First, the pedestals 86 are turbulence promoters within the microcircuit 90. Second, the pedestals 86 also serve to increase the surface area thereby enhancing the conductive heat transfer path. Third, the pedestals 86 serve to direct the cooling air to the respective exit slots 64, 66, 68, 70. Fourth, the inlets 70 provide a source of impingement cooling of the leading edge as the cooling air transitions from the inlets through the respective plenums 80, 82. The plenums 80, 82 and the pedestals 86 thus form micropassages within the leading edge 46 of the airfoil 32. Thus, the present invention does not rely completely on film cooling to cool the leading edge 46 of the airfoil 32 (FIG. 2).

Still further, the present invention provides the capability to tailor the spacing of the exit slots 64, 66, 68, 70 that provide film cooling to the leading edge 46. In the prior art, the spacing between the film cooling holes provides modest film cooling coverage. The cooling of the metal in this area depends on conduction within the metal to cool the leading edge surface and, as such, the metal experiences temperatures higher than the average film temperature. The present invention, unlike the prior art, advantageously provides for the shape of the outlets to be elongated slots that are, preferably and as described hereinabove, fed from two inlets per exit slot to ensure a uniform ejection of cooling air from the exit slots 64, 66, 68, 70 that fills the trench 52 with the cooling air 40. In prior art designs, the holes are circular in shape as the method of manufacture is drilling. Thus, in the present invention, the coverage provided by film cooling is effective and efficient as compared to the prior art designs.

The present invention also advantageously provides a cooling design for an airfoil leading edge that reduces plugging of the apertures due to a variety of reasons ranging from oxidation, erosion, foreign object damage and dirt plugging. Preventing plugging avoids conditions that can cause adverse spalling of the thermal barrier coating that is used on airfoils in a gas turbine environment.

Yet another advantage of the present invention is that the feed inlets 72, 74, 76, 78 can be sized to feed the cooling air 40 from the internal cavity 36 at a rate that is tailored for a specific airfoil design and for a specific application. This capability advantageously permits the cooling flow that enters the microcircuit to be metered so that only the optimal cooling air flow amount is extracted from the compressor 16 (FIG. 1) to cool the airfoil 32 (FIG. 2), the leading edge 46, for example. Thus, by extracting only what is necessary, more cooling air is permitted to remain in the main gas path as compared to prior art designs.

As described above, the present invention can be implemented and utilized in connection with many alternative airfoil (blade and vane) configurations. Further, it is understood by those skilled in the art and within the scope of this invention, that the size, shape and orientation of the pedestals 86, as well as exit slots 64, 66, 68, 70 and feed inlet 72, 74, 76, 78 size and orientation can all be varied to optimize the leading edge 46 for a given airfoil design.

Thus, the present invention provides a cooling system that employs a novel approach to both film and convectively cool an airfoil. In particular, this combination provides an advantage over the prior art leading edge film cooling schemes in that, to achieve the same metal temperature at the leading edge, less cool compressor air is required to cool the leading edge. Less compressor bleed flow results in the additional advantage of providing an increase in turbine efficiency. As compared to the prior art, the present invention provides a novel cooling design to synergistically improve performance and extend airfoil life. The present invention provides an improved means to film cool the leading edge as well as a new approach to efficiently and effectively convectively cool the leading edge. The combination of effective convective cooling and effective thermal insulation on the leading edge due to film cooling provides an improvement over conventional airfoil designs. Thus, an airfoil employing the beneficial cooling design of the present invention will not only have a longer service life but also improve overall turbine efficiency.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

We claim:

1. A hollow airfoil, comprising:
   an internal cavity into which cooling air is flowable from an end of the airfoil;
   an external wall which includes suction and pressure sidewalls joined together at leading and trailing edges and extending from a first end at a platform to a second end;
   a stagnation line, said stagnation line extends spanwise along said leading edge;
   a longitudinally extending first plenum disposed proximate to said leading edge and said pressure sidewall;
   a plurality of first inlets in flow communication with said first plenum and cooling air within said cavity;
   a plurality of discrete first pedestals, said pedestals extend in the spanwise direction within said first plenum;
   a trench disposed in said external wall centered on said stagnation line, said trench extends in a spanwise direction and includes a first half and a second half, said first and second halves separated by said stagnation line; and
   a plurality of first exit apertures disposed adjacent said stagnation line and within said first half of said trench adjacent said pressure sidewall, said first apertures in flow communication with said first plenum;
   wherein cooling air enters said first plenum through said first inlets, impinges onto said first pedestals and is directed into said first apertures, said first apertures direct cooling air exiting therefrom over said stagnation line and onto said suction sidewall to film cool the airfoil.

2. The airfoil of claim 1, further including:
   a longitudinally extending second plenum disposed proximate to said leading edge and said suction sidewall;
   a plurality of second inlets in flow communication with said second plenum and cooling air within said cavity;
   a plurality of discrete second pedestals, said pedestals extend in the spanwise direction within said second plenum; and
   a plurality of second exit apertures disposed adjacent said stagnation line and within said second half of said trench adjacent said suction sidewall, said second apertures in flow communication with said second plenum;
   wherein cooling air enters said second plenum through said second inlets, impinges onto said second pedestals and is directed into said second exit apertures, said second exit apertures direct cooling air exiting therefrom over said stagnation line and onto said pressure sidewall to film cool the airfoil.

3. The airfoil of claim 2, further including:
   a plurality of third inlets in flow communication with said first plenum and cooling air within said cavity; and
   a plurality of third exit apertures disposed adjacent to said first exit apertures and within said pressure sidewall, said third exit apertures in flow communication with said first plenum;
   wherein cooling air enters said first plenum through said third inlets, impinges onto said first pedestals and is directed into said third exit apertures, said third exit apertures direct cooling air exiting therefrom onto said pressure sidewall to film cool the airfoil.

4. The airfoil of claim 3, further including:
   a plurality of fourth inlets in flow communication with said second plenum and cooling air within said cavity; and
   a plurality of fourth exit apertures disposed adjacent to said second exit apertures and within said suction sidewall, said fourth exit apertures in flow communication with said second plenum;
   wherein cooling air enters said second plenum through said fourth inlets, impinges onto said second pedestals and is directed into said fourth exit apertures, said fourth exit apertures direct cooling air exiting therefrom onto said suction sidewall to film cool the airfoil.

5. The airfoil of claim 2, wherein said first inlets and said second inlets alternate to form a longitudinally extending row.

6. The airfoil of claim 2, wherein said first and second apertures extend in separate longitudinal rows, said first and second apertures are offset from each other.

7. The airfoil of claim 4, wherein said third apertures extend in a longitudinal row, said third apertures parallel to said first apertures and said fourth apertures extend in a longitudinal row, said fourth apertures parallel to said second apertures.

8. The airfoil of claim 1, wherein said first pedestals within said first plenum are shaped to promote turbulence of cooling air within said first plenum and increase the heat conduction within said leading edge.

9. The airfoil of claim 2, wherein said second pedestals within said second plenum are shaped to promote turbulence of cooling air within said second plenum and increase the heat conduction within said leading edge.

10. The airfoil of claim 2, wherein said first and second pedestals include a center portion and first and second segments that flare outward from said center portion, and said first and second segments of each of said first and second pedestals are aligned to form a longitudinal extending row.

11. The airfoil of claim 2, wherein said first and second apertures are shaped as slots and have dimensions no greater than about 0.200 inches.

12. The airfoil of claim 4, wherein said third and fourth apertures are shaped as slots.

13. The airfoil of claim 1, wherein said second end is a free tip.

14. The airfoil of claim 4, wherein said first and second pedestals are propeller shaped.

15. The airfoil of claim 2, wherein said first and second inlets are shaped as slots.

16. The airfoil of claim 4, wherein said third and fourth inlets are shaped as slots.

17. The airfoil of claim 5, wherein said first and second inlets extend longitudinally along a mean camber line of the airfoil.

18. A hollow airfoil, comprising:
- an internal cavity into which cooling air is flowable from an end of the airfoil;
- an external wall which includes pressure and suction sidewalls joined together at leading and trailing edges and extending from a root to a tip;
- a stagnation line, said stagnation line extends spanwise along said leading edge;
- a trench disposed in said external wall, said trench extends in a spanwise direction and includes a first half and a second half, said first and second halves separated by said stagnation line;
- a first cooling flow passage having a first inlet in flow communication with said internal cavity, a first outlet disposed within said first portion of said trench between said pressure sidewall and said stagnation line, and a first pedestal extending within said first cooling passage such that cooling air enters said first cooling passage through said first inlet, impinges onto said first pedestal and is directed to exit the airfoil through said first outlet to film cool the suction sidewall; and
- a second cooling flow passage having a first inlet in flow communication with said internal cavity, a first outlet disposed within said second portion of said trench between said suction sidewall and said stagnation line, and a second pedestal extending within said second cooling passage such that cooling air enters said second cooling passage through said first inlet of said second cooling passage, impinges onto said second pedestal and is directed to exit the airfoil through said first outlet of said second cooling passage disposed in said second portion to film cool the pressure sidewall.

19. The airfoil of claim 18, wherein said first outlet of said first cooling passage is staggered relative to said first outlet of said second cooling passage.

20. The airfoil of claim 18, wherein said first cooling passage further includes:
- a second inlet in flow communication with said internal cavity; and
- a second outlet disposed within said pressure sidewall and adjacent to said leading edge;
- wherein cooling air enters said second inlet of said first cooling passage and impinges onto said first pedestal such that cooling air is directed to exit the airfoil through said second outlet of said first cooling passage to film cool the pressure sidewall; and said second cooling passage further includes:
- a second inlet in flow communication with said internal cavity; and
- a second outlet disposed within said suction sidewall and adjacent to said leading edge;
- wherein cooling air enters through said second inlet of said second cooling passage and impinges onto said second pedestal such that cooling air is directed to exit the airfoil through said second outlet of said second cooling passage to film cool the suction sidewall.

21. The airfoil of claim 20, wherein said first and second pedestals are bow-tie shaped having a center portion and first and second segments longitudinally extending from said center portion, said first cooling passage further includes:
- a third outlet disposed within said first portion of said trench between said pressure sidewall and said stagnation line,
- wherein cooling air enters said first inlet of said first cooling passage, impinges onto said center portion of said first pedestal and is directed by said first and second segments of said first pedestal to exit the airfoil through said first and third outlets of said first cooling passage to film cool the suction sidewall; and said second cooling passage further includes:
- a third outlet disposed within said second portion of said trench between said suction sidewall and said stagnation line,
- wherein cooling air enters said first inlet of said second cooling passage, impinges onto said center portion of said second pedestal and is directed by said first and second segments of said second pedestal to exit the airfoil through said first and third outlets of said second cooling passage to film cool the pressure sidewall.

22. The airfoil of claim 21, wherein said first cooling passage further includes:
- a fourth outlet disposed within said pressure sidewall and adjacent to said leading edge;
- wherein cooling air enters said second inlet of said first cooling passage, impinges onto said center portion of said first pedestal and is directed by said first and second segments of said first pedestal to exit the airfoil through said second and fourth outlets of said first cooling passage to film cool the pressure sidewall; and said second cooling passage further includes:
- a fourth outlet disposed within said suction sidewall and adjacent to said leading edge;
- wherein cooling air enters said second inlet of said second cooling passage, impinges onto said center portion of said second pedestal and is directed by said first and second segments of said second pedestal to exit the airfoil through said second and fourth outlets of said second cooling passage to film cool the suction sidewall.

23. The airfoil of claim 21, wherein said first cooling passage further includes:
- a third inlet in flow communication with said cavity; and
- a third pedestal extending within said first cooling passage, said third pedestal is bow-tie shaped having a center portion and first and second segments longitudinally extending from said center portion;
- wherein cooling air enters said first inlet of said first cooling passage and impinges onto said center portion of said first pedestal and is directed by said first segment of said first pedestal to exit the airfoil through said first outlet of said first cooling passage to film cool the suction sidewall and cooling air enters said third inlet of said first cooling passage and impinges onto said center portion of said third pedestal, and is directed by said second segment of said third pedestal to exit the airfoil through said first outlet of said first cooling passage to film cool the suction sidewall; and said second cooling passage further includes:
a third inlet in flow communication with said cavity; and
a fourth pedestal extending within said first cooling passage, said fourth pedestal is bow-tie shaped having a center portion and first and second segments longitudinally extending from said center portion;
wherein cooling air enters said first inlet of said second cooling passage and impinges onto said center portion of said second pedestal and is directed by said first segment of said second pedestal to exit the airfoil through said first outlet of said second cooling passage to film cool the pressure sidewall and cooling air enters said third inlet of said second cooling passage and impinges onto said center portion of said fourth pedestal, and is directed by said second segment of said fourth pedestal to exit the airfoil through said first outlet of said second cooling passage to film cool the pressure sidewall.

24. The airfoil of claim 18, wherein said first inlets are shaped as slots and have a length no greater than 0.030 inches and said first outlets are shaped as slots and have a length no greater than about 0.2 inches.

25. The airfoil of claim 23, wherein said first inlets and said third inlets of said first and second cooling passages alternate to form a longitudinally extending row.

26. The airfoil of claim 18, wherein said first and second pedestals are shaped to promote turbulence of cooling air and increase the heat conduction within said leading edge.

27. The airfoil of claim 20, wherein said second inlets are shaped as slots and have a length no greater than 0.030 inches and said second outlets are shaped as slots and have a length no greater than about 0.2 inches.

28. The airfoil of claim 18, wherein said second end is a free tip.

29. A method for cooling a leading edge of a hollow airfoil suitable for use in gas turbine, comprising the steps of:
providing cooling flow from a cooling fluid source to flow into the inlet; and
fabricating a microcircuit within the leading edge, the microcircuit comprising:
a longitudinally extending plenum disposed proximate to the leading edge:
a plurality of inlets in flow communication with the plenum through which cooling flow may enter;
a plurality of discrete pedestals, the pedestals extend in the spanwise direction within the plenum;
a trench disposed in the leading edge, the trench extends in a spanwise direction; and
a plurality of first exit apertures disposed within the trench, the first exit apertures in flow communication with the plenum, the first exit apertures transitions the cooling flow from the plenum to a region exterior to the leading edge of the airfoil to film cool the leading edge.

30. The method of claim 29, wherein the fabricating the microcircuit comprises the steps of:
fashion a refractory metal into the form of the plenum and the discrete pedestals;
inserting the refractory metal into a mold for casting the airfoil; and
removing the refractory metal from the airfoil after casting.

31. The method of claim 30, wherein the airfoil is fabricated from a metal selected from the group consisting of nickel based alloys and cobalt based alloys.

32. The method of claim 30, wherein the pedestal has a length no greater than about 0.150 inches and the inlets have a dimension no greater than 0.030 inches and the exit apertures have a dimension no greater than about 0.200 inches.

* * * * *